(12) United States Patent
Yang et al.

(10) Patent No.: US 10,045,028 B2
(45) Date of Patent: Aug. 7, 2018

(54) MEDIA DISPLAY SYSTEM THAT EVALUATES AND SCORES MACRO-BLOCKS OF MEDIA STREAM

(71) Applicant: FREESCALE SEMICONDUCTOR, INC., Austin, TX (US)

(72) Inventors: Hongzhang Yang, Shanghai (CN); Zening Wang, Nanjing (CN); Peng Zhou, Shanghai (CN)

(73) Assignee: NXP USA, INC., Austin, TX (US)

( * ) Notice: Subject to any disclaimer, the term of this patent is extended or adjusted under 35 U.S.C. 154(b) by 353 days.

(21) Appl. No.: 15/139,332

(22) Filed: Apr. 27, 2016

(65) Prior Publication Data
US 2017/0054993 A1   Feb. 23, 2017

(30) Foreign Application Priority Data
Aug. 17, 2015   (CN) .......................... 2015 1 0625936

(51) Int. Cl.
| | |
|---|---|
| *H04N 19/132* | (2014.01) |
| *H04N 19/114* | (2014.01) |
| *H04N 19/142* | (2014.01) |
| *H04N 19/139* | (2014.01) |
| *H04N 19/179* | (2014.01) |
| *H04N 19/107* | (2014.01) |

(52) U.S. Cl.
CPC ......... *H04N 19/132* (2014.11); *H04N 19/107* (2014.11); *H04N 19/114* (2014.11); *H04N 19/139* (2014.11); *H04N 19/142* (2014.11); *H04N 19/179* (2014.11)

(58) Field of Classification Search
CPC .. H04N 19/132; H04N 19/142; H04N 19/107; H04N 19/114
See application file for complete search history.

(56) References Cited

U.S. PATENT DOCUMENTS

| | | | |
|---|---|---|---|
| 6,842,484 B2 * | 1/2005 | Gandhi ................... | H04N 19/61 375/240.24 |
| 7,010,044 B2 | 3/2006 | Dattani et al. | |
| 7,457,362 B2 | 11/2008 | Sankaran | |
| 7,760,809 B2 | 7/2010 | Bae | |
| 7,974,479 B2 * | 7/2011 | Tsukuda ............... | H04N 19/172 375/240.02 |
| 8,094,721 B2 * | 1/2012 | Song .................... | H04N 19/176 375/240.12 |
| 8,111,760 B2 | 2/2012 | Hung | |
| 8,121,197 B2 | 2/2012 | Rosenzweig et al. | |
| 8,179,964 B1 | 5/2012 | Masterson | |

(Continued)

FOREIGN PATENT DOCUMENTS

| | | | | |
|---|---|---|---|---|
| WO | 2008/033595 | | 3/2008 | |
| WO | WO-2017122604 A1 * | | 7/2017 | ........... H04N 19/176 |

*Primary Examiner* — David N Werner
(74) *Attorney, Agent, or Firm* — Charles E. Bergere (57) ABSTRACT

A display system for displaying a media stream based on a given access point includes a decoder for decoding frames of the media stream, and an evaluation unit for scoring macro blocks (MBs) of a current frame. A score of an intra-MB is defined as a predetermined value, and a score of an inter-MB is generated based on scores of MBs in previously decoded frames. A controller signals a display to skip the current frame or start to display the media stream from a qualified frame identified using the scores of the MBs of at least the current frame.

20 Claims, 7 Drawing Sheets

(56) References Cited

U.S. PATENT DOCUMENTS

| | | | |
|---|---|---|---|
| 8,295,360 B1 | 10/2012 | Lewis | |
| 8,494,062 B2 | 7/2013 | Kuo | |
| 8,526,509 B2 | 9/2013 | Norkin et al. | |
| 8,724,694 B2 | 5/2014 | Jia | |
| 8,761,538 B2 | 6/2014 | Pereira et al. | |
| 8,867,605 B2 | 10/2014 | Jia | |
| 8,897,583 B2 | 11/2014 | Amano et al. | |
| 8,964,833 B2 | 2/2015 | Auwera et al. | |
| 9,955,158 B2 * | 4/2018 | Yang | H04N 19/107 |
| 2005/0024487 A1 * | 2/2005 | Chen | H04N 19/172 348/14.13 |
| 2005/0078051 A1 * | 4/2005 | Abe | G09G 3/22 345/1.1 |
| 2005/0117653 A1 | 6/2005 | Sankaran | |
| 2005/0259744 A1 | 11/2005 | Hellman | |
| 2006/0115002 A1 | 6/2006 | Kim et al. | |
| 2006/0245503 A1 | 11/2006 | Gordon | |
| 2008/0117980 A1 | 5/2008 | Hung et al. | |
| 2008/0123750 A1 | 5/2008 | Bronstein et al. | |
| 2008/0193024 A1 | 8/2008 | Lee et al. | |
| 2008/0240252 A1 | 10/2008 | He | |
| 2009/0129478 A1 | 5/2009 | Meroth | |
| 2009/0279611 A1 | 11/2009 | Gao | |
| 2010/0124274 A1 * | 5/2010 | Cheok | H04N 19/176 375/240.03 |
| 2011/0103490 A1 | 5/2011 | Kuo | |
| 2011/0200100 A1 | 8/2011 | Kim et al. | |
| 2011/0274158 A1 | 11/2011 | Fu et al. | |
| 2012/0189051 A1 | 7/2012 | Zheng | |
| 2012/0213293 A1 | 8/2012 | Chong et al. | |
| 2012/0257702 A1 | 10/2012 | Narroschke et al. | |
| 2012/0287994 A1 | 11/2012 | Van der Auwera et al. | |
| 2013/0022107 A1 | 1/2013 | Van der Auwera et al. | |
| 2013/0094572 A1 | 4/2013 | Van der Auwera et al. | |
| 2013/0136188 A1 | 5/2013 | Kumar et al. | |
| 2014/0233649 A1 | 8/2014 | Cheng et al. | |
| 2014/0286442 A1 | 9/2014 | Kim et al. | |
| 2014/0301460 A1 * | 10/2014 | Karczewicz | H04N 19/147 375/240.12 |
| 2014/0376634 A1 | 12/2014 | Guo et al. | |
| 2016/0219273 A1 * | 7/2016 | Pettersson | H04N 19/70 |
| 2016/0219301 A1 * | 7/2016 | Pettersson | H04N 19/176 |
| 2016/0219306 A1 * | 7/2016 | Pettersson | H04N 19/176 |

* cited by examiner

MEDIA DISPLAY SYSTEM THAT EVALUATES AND SCORES MACRO-BLOCKS OF MEDIA STREAM

BACKGROUND

The present invention relates generally to media display systems, and, more particularly, to a display system for displaying a media stream based on a random access point.

Figure 1:
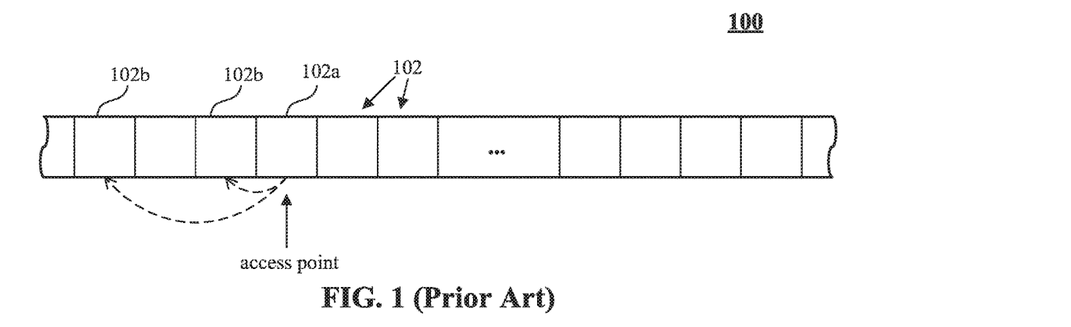
FIG. 1 is a diagram illustrating a conventional bitstream including a plurality of frames.
Figure 2:
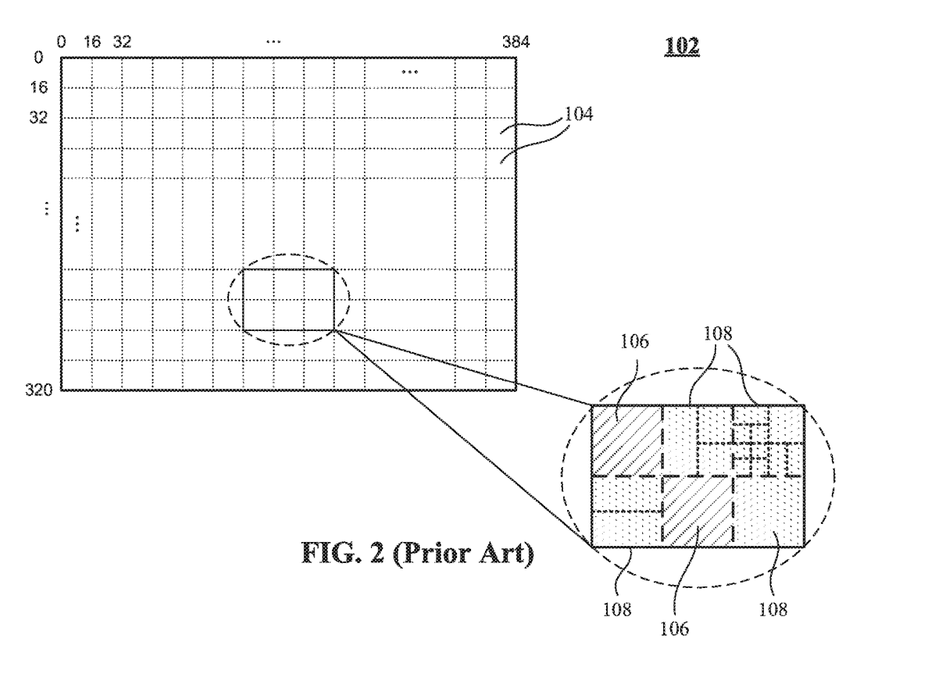
FIG. 2 is a diagram illustrating a conventional frame in the bitstream that is formed with a plurality of macro blocks.

In some video applications in favor of uniform (even) channel bandwidth utilization, intra-refresh encoding is more preferable than conventional periodic key frame encoding. However, for bitstream encoding using intra-refresh, it is more difficult to achieve random access due to a lack of key frames. FIG. 1 shows a conventional bitstream 100 including a plurality of frames 102 encoded using an intra-refresh scheme. Decoding a certain frame 102a indicated by a given random access point requires information in reference frames 102b that have been previously decoded. As shown in FIG. 2, which illustrates the frame 102 in the bitstream 100 that is formed with a plurality of macro blocks (MBs) 104, the MBs 104 include intra-MBs 106 that are decoded based on information in the current frame, and inter-MBs 108 that are decoded based on information in previously decoded reference frames. Therefore, the frame 102 at the given random access point cannot be reconstructed correctly because the reference frames based on which the inter-MBs 108 in the frame 102 are decoded are skipped, which brings unpleasant mosaics when displaying frames right after the random access point until more frames 102 are gradually decoded. Therefore, it would be beneficial to determine a frame with satisfactory visual quality after the random access point and start to display the bitstream from the determined frame to improve the user experience.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a display system for displaying a media stream with a display based on a given access point is provided. The media stream has a plurality of frames, each frame including a plurality of macro blocks (MBs). The display system includes a decoder for decoding the plurality of frames, and an evaluation unit connected to the decoder for scoring a plurality of MBs of a current frame that is being decoded, wherein the plurality of MBs includes intra-MBs that are decoded based on information in the current frame, and inter-MBs that are decoded based on information in previously decoded frames, wherein a score of an intra-MB is defined as a predetermined value, and a score of an inter-MB is generated based on scores of MBs in previously decoded frames. A controller is connected to the evaluation unit for signaling the display to skip the current frame or start to display the media stream from a qualified frame identified using the scores of the plurality of MBs of at least the current frame.

In another embodiment, the present invention provides a method for displaying a media stream on a display based on a given access point with a display system. The media stream has a plurality of frames, each frame including a plurality of macro blocks (MBs). The method includes decoding the plurality of frames in the media streams from a first frame defined by the given access point, and scoring a plurality of MBs in a current frame that is being decoded, wherein the plurality of MBs includes intra-MBs that are decoded based on information in the current frame, and inter-MBs that are decoded based on information in previously decoded frames. A score of an intra-MB is defined as a predetermined value, and a score of an inter-MB is generated based on scores of MBs in the previously decoded frames. The method further includes signaling the display to skip the current frame or start to display the media stream from a qualified frame identified based on the scores of the plurality of MBs in at least one of the current frame and the previously decoded frame.

Figure 3:
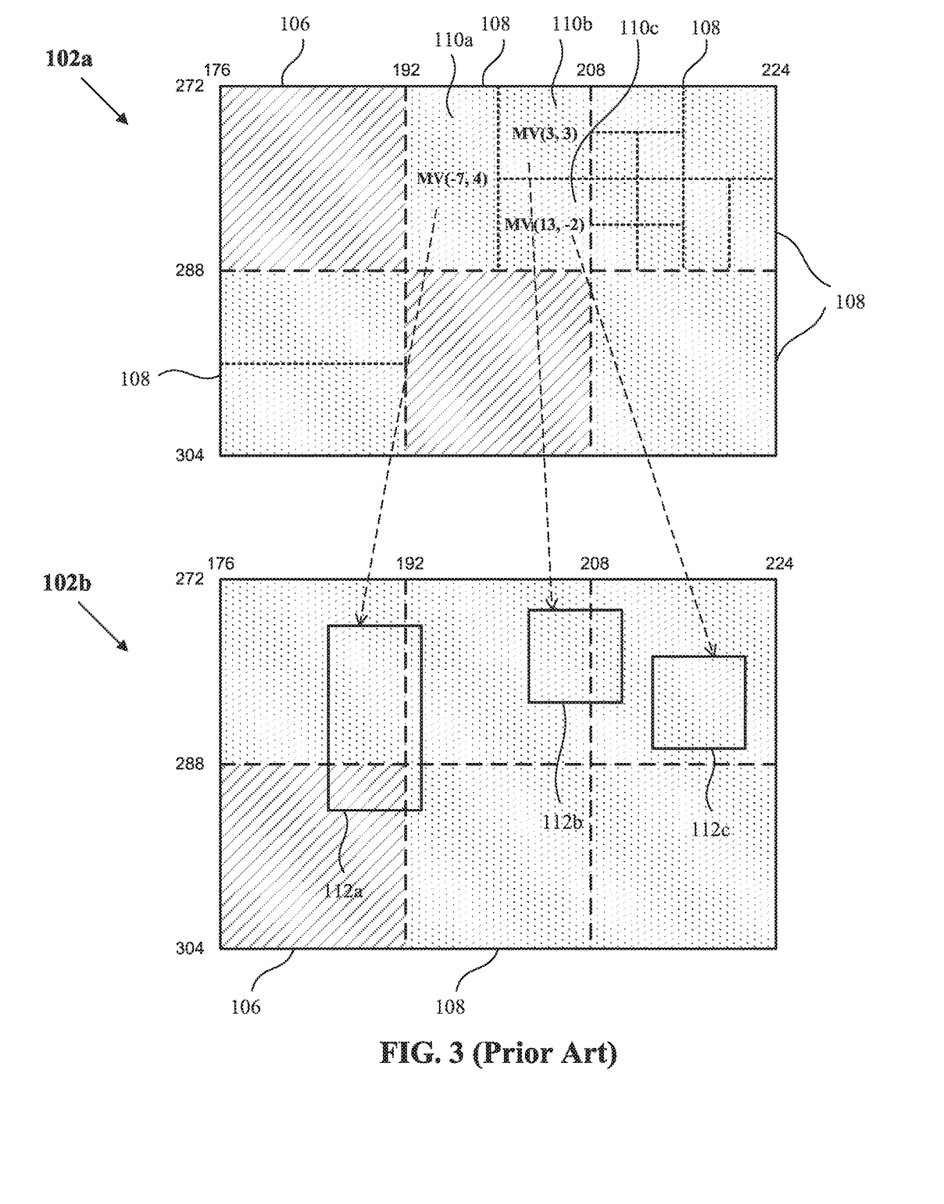
FIG. 3 is a diagram illustrating a mapping between prediction blocks of a macro block in a current frame and corresponding reference blocks in a reference frame.

Referring now to FIG. 3, a mapping between prediction blocks of an inter-MB 108 in a current frame 102a and corresponding reference blocks in a reference frame 102b that has been previously decoded is provided. A frame having a size of 384×320 pixels includes 480 MBs each having a size of 16×16 pixels. In FIG. 3, only part of the MBs in each of the current frame 102a and the reference frame 102b are shown with corresponding coordinates information of the MBs. The MBs includes a plurality of intra-MBs 106 and a plurality of inter-MBs 108. Each inter-MB includes at least one prediction block. For example, as shown in FIG. 3, the inter-MB 108 includes first, second and third prediction blocks 110a, 110b and 110c. The first, second and third prediction blocks are respectively decoded based on first, second and third corresponding reference blocks 112a, 112b and 112c in the corresponding reference frame 102b determined by a motion vector of each of the first, second and third prediction blocks 110a, 110b and 110c. Information of the reference frame and the motion vector of each prediction block is encoded in the prediction block. The first and second reference blocks 112a and 112b are across different MBs of the reference frame 102b, and the third reference block 112c is located within one single MB of the reference frame 102b.

Figure 4:
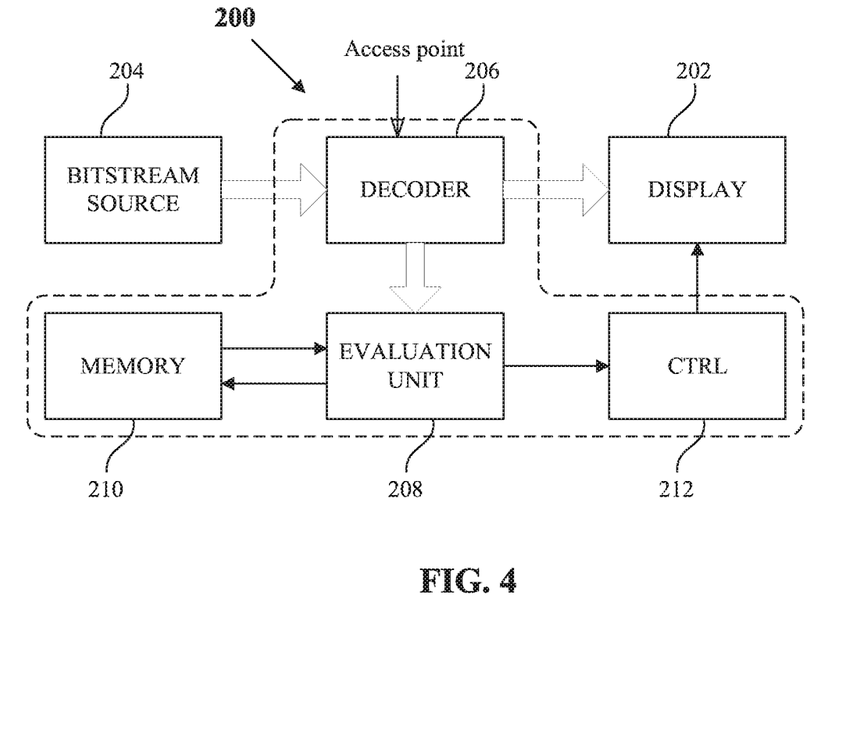
FIG. 4 is a schematic block diagram of a media stream display system in accordance with an embodiment of the present invention.

Referring now to FIG. 4, a schematic block diagram illustrating a media stream display system 200 for displaying a media stream with a display 202 based on a given access point in accordance with an embodiment of the present invention is shown. The media stream is obtained from a bitstream source 204 which is a data input unit of the display system 200. The display system 200 includes a decoder 206 for decoding a plurality of frames of the media stream from the given access point, an evaluation unit 208 connected to the decoder 206 for scoring a plurality of MBs of a current frame that is being decoded, wherein the plurality of MBs includes intra-MBs that are decoded based on information in the current frame, and inter-MBs that are decoded based on information in previously decoded frames, wherein a score of an intra-MB is defined as a predetermined value, e.g. 100, and a score of an inter-MB is generated based on scores of MBs in reference frames that have been previously decoded, and a memory 210 connected to the evaluation unit 208 for storing the scores of the MBs of the previously decoded frames, wherein the memory can be a RAM, ROM or flash memory.

Figure 5:
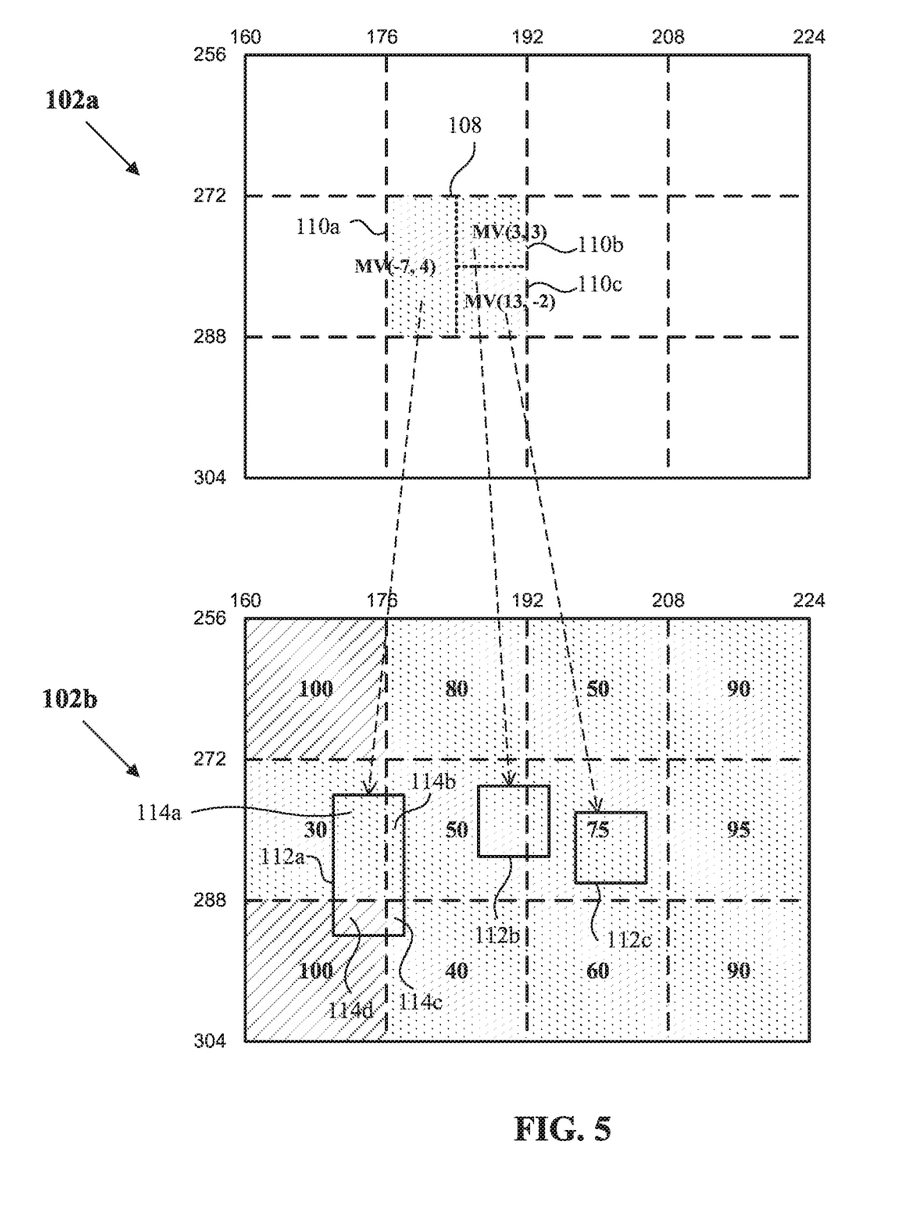
FIG. 5 is a diagram illustrating scoring a macro block based on the mapping between prediction blocks of the macro block in the current frame and corresponding reference blocks in the reference frame in accordance with an embodiment of the present invention.

FIG. 5 shows a diagram illustrating scoring the inter-MB 108 based on the mapping between the first, second and third prediction blocks 110a, 110b and 110c of the inter-MB 108 in the current frame 102a and the corresponding first, second and third reference blocks 112a, 112b and 112c in the reference frame 102b in accordance with an embodiment of the present invention. The reference frame 102b is one of the previously decoded frames. In FIG. 5, only part of the MBs in each of the current frame 102a and the reference frame 102b are shown with corresponding coordinates information of the MBs. The encoded data in the current frame 102a includes segment of the prediction blocks, motion vectors of the prediction blocks for determining corresponding reference blocks in reference frames 102b, and information of the reference frames of the prediction blocks. For example, the motion vector of the first prediction block 110a of the inter-MB 108 of the current frame 102a is MV (−7, 4). To score the inter-MB 108, the evaluation unit 208 determines the corresponding first, second and third reference blocks 112a, 112b and 112c in the reference frame 102b based on the motion vectors of the first, second and third prediction blocks 110a, 110b and 110c, and respectively breaks down the first, second and third corresponding reference blocks 112a, 112b and 112c of the first prediction block into a plurality of portions respectively located within corresponding MBs of the reference frame 102b. For example, the first reference block 112a is broken down into first, second, third and fourth portions 114a, 114b, 114c and 114d that are respectively located within corresponding MBs that are located at (160, 272), (176, 272), (176, 288) and (160, 288) in the reference frame 102b.

The evaluation unit 208 calculates a score of each portion based on the score of the corresponding MB which the portion belongs to, a proportion of an area of the portion and an area of the corresponding MB, and a quality distribution among the corresponding MB and adjacent MBs thereof, sums the scores of the plurality of portions in each prediction block as a score of the prediction block, and generates a score of the inter-MB by summing the scores of the at least one prediction block in the inter-MB.

In a preferred embodiment, the score of each prediction block (PB) is calculated as:

$$\text{Score}_{PB} = \sum_{i=1}^{N} k_{1\_i} \cdot \frac{\text{Area}_{P\_i}}{\text{Area}_{MB\_i}} \cdot \text{Score}_{MB\_i},$$

wherein $\text{Area}_{P\_i}$ is the area of the $i^{th}$ portion of the prediction block, $\text{Area}_{MB\_i}$ is the area of the corresponding MB that the $i^{th}$ portion belongs to, $\text{Score}_{MB\_i}$ is the score of the corresponding MB stored in the memory 210, $k_{1\_i}$ is a first weight coefficient of the $i^{th}$ portion determined based on quality distribution among the corresponding MB and adjacent MBs thereof, and N is the number of portions in the prediction block. In a preferred embodiment, if the score of the corresponding MB is not available in the memory 210, e.g. the reference frame that the corresponding MB belongs to has not been previously decoded, the score of the corresponding MB is determined as 0.

In a preferred embodiment, in an even quality distribution situation among the corresponding MB and adjacent MBs thereof, $k_{1\_i}=1$, the score of each portion is calculated by multiplying the score of the corresponding MB which the portion belongs to and the proportion of an area of the portion and an area of the corresponding MB. For example, the evaluation unit 208 obtains the score 30 of the MB located at (160, 272) which the first portion 114a belongs to from the memory 210, and calculates a proportion of the area of the first portion 114a and the area of the MB located at (160, 272) based on the motion vector (−7, 4). The area of the first portion 114a is 7×12=84, and the area of the MB located at (160, 272) is 16×16=256, thus the proportion is 84/256, therefore the score of the first portion 114a is 30×84/256=9.84375. The scores of the second, third and fourth portion 114b, 114c and 114d are respectively calculated in a same way shown as in Table 1 below:

TABLE 1

| Portion | Area of the portion | Score of MB | Score of the portion |
|---|---|---|---|
| $1^{st}$ portion 114a | 84 | 30 | 9.84375 |
| $2^{nd}$ portion 114b | 12 | 50 | 2.34375 |
| $3^{rd}$ portion 114c | 4 | 40 | 0.625 |
| $4^{th}$ portion 114d | 28 | 100 | 10.9375 |

The evaluation unit 208 sums the scores of the plurality of portions in the first prediction block 110a as the score of the first prediction block 110a. The scores of the second and third prediction blocks 110b and 110c of the inter-MB 108 are respectively calculated in a same way shown as in Table 2 below:

TABLE 2

| Prediction block | Area of the portion |
|---|---|
| $1^{st}$ prediction block 110a | 23.75 |
| $2^{nd}$ prediction block 110b | 14.84375 |
| $3^{rd}$ prediction block 110c | 18.75 |

In a preferred embodiment, the score of each inter-MB of the current frame is calculated as:

$$\text{Score}_{MB} = \sum_{i=1}^{M} k_{2\_i} \cdot \text{Score}_{PB\_i},$$

wherein $\text{Score}_{PB\_i}$ is the score of the $i^{th}$ prediction block of the inter-MB, and $k_{2\_i}$ is a second weight coefficient of the $i^{th}$ prediction block predetermined by the display system based on the reference frame that the reference block of the prediction block belongs to, and M is the number of prediction blocks of the inter-MB 108. If the reference blocks of the prediction blocks in the inter-MB belong to more than one reference frame, summing the scores of the prediction blocks in the inter-MB includes weighing the scores of the prediction blocks with the corresponding second weight coefficients $k_{2\_i}$ of the more than one reference frames. If all the prediction blocks of the inter-MB belongs to a same reference frame, the second weight coefficient $k_{2\_i}$ is 1. Therefore, in this example, the score of the inter-MB 108 is 57.34375. The evaluation unit 208 stores the score of the inter-MB 108 in the memory 210.

Referring back to FIG. 4, the display system 200 further includes a controller 212 connected to the evaluation unit for signaling the display 202 to skip the current frame 102a or start to display the media stream from a qualified frame identified using the scores of the plurality of MBs of at least the current frame 102a.

Figure 6:
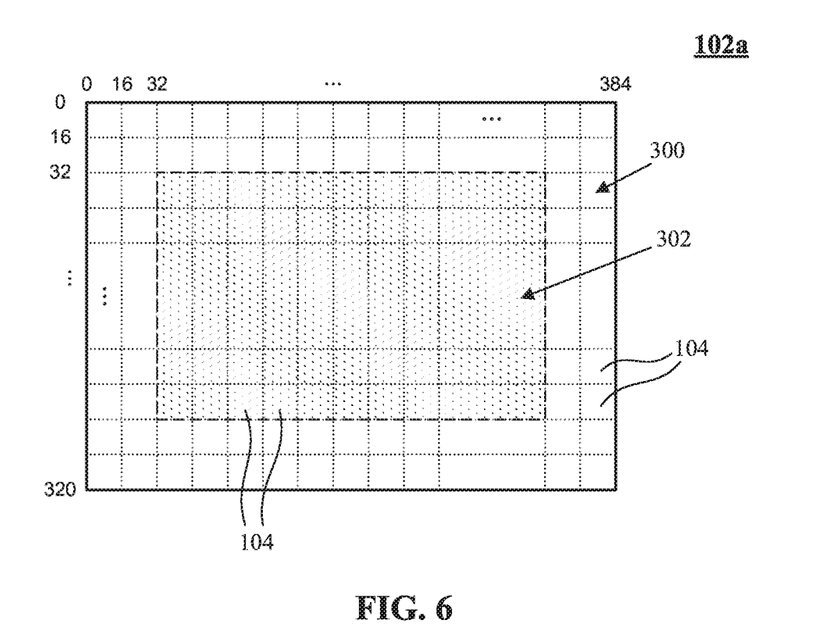
FIG. 6 is a diagram illustrating shows a current frame that has a first region and a second region which is predetermined as a region of interest.

In a preferred embodiment, the current frame 102a is identified as the qualified frame if MBs that have scores below a predetermined threshold are out of a predetermined region of the current frame 102a. FIG. 6 shows an example illustrating the current frame 102a that has a first region 300 adjacent to at least one side of the current frame 102a, and a second region 302 which is predetermined as a region of interest based on user's preference. The current frame 102a is identified as the qualified frame if MBs that have scores below a predetermined threshold are out of the second region 302 of the current frame 102a.

In another preferred embodiment, the current frame 102a is identified as the qualified frame if a distance between a position of a first MB that has the lowest score among the MBs in the current frame and a position of a second MB that has the lowest score among the MBs in a last frame is greater than a predetermined distance.

In yet another preferred embodiment, the qualified frame is identified based on a frame score of at least one of the current frame 102a and the previously decoded frames. The frame score of each frame is determined based on scores of the MBs in the frame. In a preferred embodiment, the frame score of the each frame is determined as a weighted sum of scores of the MBs in the frame, wherein a weight coefficient of each MB is predetermined based on region of interest, and stored in the memory. In another preferred embodiment, the frame score of the each frame is determined as the lowest score of the scores of the MBs in the frame. In a preferred embodiment, the current frame 102a is identified as the qualified frame if the frame score of the current frame 102a is no less than a first predetermined threshold. In another preferred embodiment, either one of the current frame and a last frame is identified as the qualified frame if difference of the frame scores of the current frame and the last frame is less than a second predetermined threshold. In yet another preferred embodiment, one of the current frame 102a and last two frames is identified as the qualified frame if difference between difference of the frame scores of the current frame and the last frame, and difference of the frame scores of the last and second last frames is less than a third predetermined threshold.

The display 202 is suppressed by the controller 212 until the controller 212 signals the display 202 to start to display the media stream from a qualified frame determined by the controller 212. The decoder 206, the evaluation unit 208 and the controller 212 can be a part of a processor, such as a CPU, a MCU or a DPU.

Figure 7:
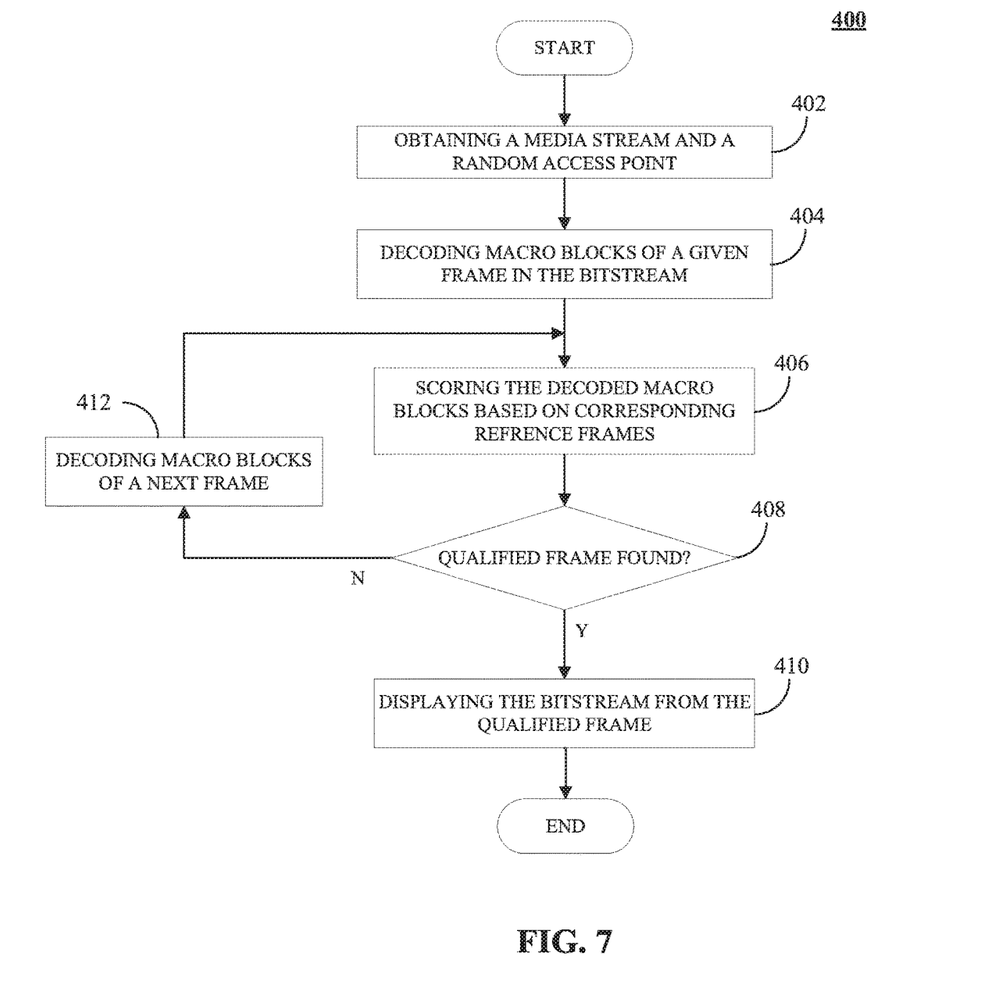
FIG. 7 is a flow chart of a method for decoding and displaying the media stream with a media stream display system in accordance with an embodiment of the present invention.

Referring now to FIG. 7, a flow chart depicting a method 400 for decoding and displaying a media stream with the media stream display system 200 in accordance with an embodiment of the present invention is shown. Steps in the flowchart of FIG. 8 have been explained in conjunction with FIGS. 4~6.

Starting at step 402, the decoder 206 obtains the media stream from the bitstream source 204 which is a data input unit of the display system 200 and a random access point from a control input unit of the display system 200.

At step 404, the decoder 206 decodes a plurality of MBs of a frame in the media stream indicated by the given random access point.

At step 406, the evaluation unit 208 scores the plurality of MBs of a current frame that is being decoded, wherein the plurality of MBs includes intra-MBs that are decoded based on information in the current frame, and inter-MBs that are decoded based on information in previously decoded frames, wherein a score of an intra-MB is defined as a predetermined value, e.g. 100, and a score of an inter-MB is generated based on scores of MBs in reference frames that have been previously decoded, and stored in the memory 210, wherein the memory can be a RAM, ROM or flash memory.

Figure 8:
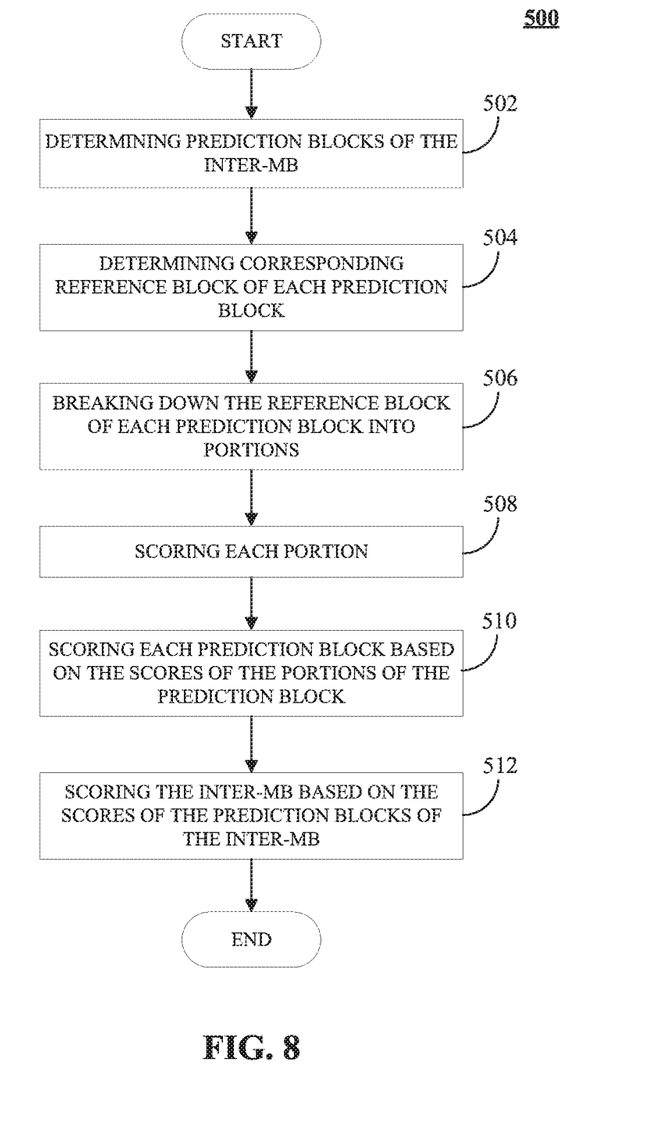
FIG. 8 is a flow chart of a method for scoring an inter-MB of the current frame in accordance with an embodiment of the present invention.

FIG. 8 is a flow chart depicting a method 500 of scoring an inter-MB of the current frame in accordance with an embodiment of the present invention.

At step 502, the decoder 206 determines prediction blocks of the inter-MB based on data of the inter-MB. Each inter-MB includes at least one prediction block.

At step 504, the evaluation unit 208 determines a corresponding reference block of each prediction block in a corresponding reference frame based on a motion vector of the prediction block.

At step 506, the evaluation unit 208 breaks down the reference block of each prediction block into a plurality of portions that respectively are located within corresponding MBs of the corresponding reference frame.

At step 508, the evaluation unit 208 calculates a score of each portion based on the score of the corresponding MB, a proportion of an area of the portion and an area of the corresponding MB, and a quality distribution among the corresponding MB and adjacent MBs thereof, and at step 510, the evaluation unit 208 scores each prediction block based on the scores of the portions of the prediction block.

In a preferred embodiment, the score of each prediction block (PB) is calculated as:

$$\text{Score}_{PB} = \sum_{i=1}^{N} k_{1\_i} \cdot \frac{\text{Area}_{P\_i}}{\text{Area}_{MB\_i}} \cdot \text{Score}_{MB\_i},$$

wherein $\text{Area}_{P\_i}$ is the area of the $i^{th}$ portion of the prediction block, $\text{Area}_{MB\_i}$ is the area of the corresponding MB that the $i^{th}$ portion belongs to, $\text{Score}_{MB\_i}$ is the score of the corresponding MB stored in the memory 210, $k_{1\_i}$ is a first weight coefficient of the $i^{th}$ portion determined based on quality distribution among the corresponding MB and adjacent MBs thereof, and N is the number of portions in the prediction block. In a preferred embodiment, if the score of the corresponding MB is not available in the memory 210, e.g. the reference frame that the corresponding MB belongs to has not been previously decoded, the score of the corresponding MB is determined as 0.

At step 512, the evaluation unit 208 generates a score of the inter-MB based on the scores of the prediction blocks of the inter-MB.

In a preferred embodiment, the score of each inter-MB of the current frame is calculated as:

$$\text{Score}_{MB} = \sum_{i=1}^{M} k_{2\_i} \cdot \text{Score}_{PB\_i},$$

wherein $\text{Score}_{PB\_i}$ is the score of the $i^{th}$ prediction block of the inter-MB, and $k_{2\_i}$ is a second weight coefficient of the $i^{th}$ prediction block predetermined by the display system based on the reference frame that the reference block of the prediction block belongs to, and M is the number of prediction blocks of the inter-MB 108. If the reference blocks of the prediction blocks in the inter-MB belong to more than one reference frame, summing the scores of the prediction blocks in the inter-MB includes weighing the scores of the prediction blocks with the corresponding second weight coefficients $k_{2\_i}$ of the more than one reference frames. If all the prediction blocks of the inter-MB belongs to a same reference frame, the second weight coefficient $k_{2\_i}$ is 1. The evaluation unit 208 further stores the score of the inter-MB in the memory 210.

Referring back to FIG. 7, at step 408, the controller 212 identifies a qualified frame from the frames that have been decoded using the scores of the MBs of the decoded frames.

In a preferred embodiment, a frame is identified as the qualified frame if MBs that have scores below a predetermined threshold are out of a predetermined region of the frame.

In another preferred embodiment, a frame is identified as the qualified frame if a distance between a position of a first MB that has the lowest score among the MBs in the current frame and a position of a second MB that has the lowest score among the MBs in a last frame is greater than a predetermined distance.

In yet another preferred embodiment, the qualified frame is identified based on a frame score of at least one of the current frame and the previously decoded frames. The frame score of each frame is determined based on scores of the MBs in the frame. In a preferred embodiment, the frame score of the each frame is determined as a weighted sum of scores of the MBs in the frame, wherein a weight coefficient of each MB is predetermined based on region of interest, and stored in the memory. In another preferred embodiment, the frame score of the each frame is determined as the lowest score of the scores of the MBs in the frame. In a preferred embodiment, the current frame is identified as the qualified frame if the frame score of the current frame is no less than a first predetermined threshold. In another preferred embodiment, either one of the current frame and a last frame is identified as the qualified frame if difference of the frame scores of the current frame and the last frame is less than a second predetermined threshold. In yet another preferred embodiment, one of the current frame and last two frames is identified as the qualified frame if difference between difference of the frame scores of the current frame and the last frame, and difference of the frame scores of the last and second last frames is less than a third predetermined threshold.

At step 410, if a qualified frame is identified, the controller 212 signals the display 202 to start to display the media stream from the qualified frame. Otherwise, at step 412, the decoder 206 continues to decode next frames while the display 202 is being suppressed by the controller 212.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A display system for displaying a media stream with a display based on a given access point, wherein the media stream has a plurality of frames, each frame comprising a plurality of macro blocks (MBs), the display system comprising:
   a decoder for decoding the plurality of frames of the media stream;
   an evaluation unit, connected to the decoder, that scores a plurality of MBs of a current frame that is being decoded, wherein the plurality of MBs include intra-MBs that are decoded based on information in the current frame, and inter-MBs that are decoded based on information in previously decoded frames, wherein a score of an intra-MB is defined as a predetermined value, and a score of an inter-MB is generated based on scores of MBs in the previously decoded frames; and
   a controller, connected to the evaluation unit, that signals the display to skip the current frame or start to display the media stream from a qualified frame identified using the scores of the plurality of MBs of at least the current frame.

2. The display system of claim 1, wherein each inter-MB comprises at least one prediction block, wherein each prediction block is decoded based on a corresponding reference block in a corresponding reference frame determined by a motion vector of the prediction block.

3. The display system of claim 2, wherein scoring an inter-MB comprises:
   determining the corresponding reference block of each prediction block of the inter-MB in a corresponding reference frame based on the motion vector,
   breaking down the corresponding reference block of each prediction block into a plurality of portions respectively located within corresponding MBs of the reference frame,
   calculating a score of each portion based on the score of the corresponding MB, a proportion of an area of the portion and an area of the corresponding MB, and a quality distribution among the corresponding MB and MBs adjacent thereto,
   generating a score of each prediction block based on the scores of the plurality of portions of each prediction block, and
   generating a score of the inter-MB by summing the scores of the at least one prediction block in the inter-MB.

4. The display system of claim 3, wherein if the reference blocks of the prediction blocks in the inter-MB belong to more than one reference frame, said summing the scores of the prediction blocks in the inter-MB comprises weighing the scores of the prediction blocks with corresponding weight coefficients of the more than one reference frames.

5. The display system of claim 1, wherein the current frame is identified as the qualified frame if MBs that have scores below a predetermined threshold are out of a predetermined region of the current frame, or a distance between a position of a first MB that has the lowest score among the MBs in the current frame and a position of a second MB that has the lowest score among the MBs in a last frame is greater than a predetermined distance.

6. The display system of claim 1, further comprising a memory coupled to the evaluation unit for storing the scores of the MBs of the previously decoded frames.

7. The display system of claim 6, wherein the qualified frame is identified based on a frame score of at least one of the current frame and the previously decoded frames, wherein the frame score of each frame is determined based on scores of the MBs in the frame.

8. The display system of claim 7, wherein the frame score of the each frame is determined as a weighted sum of scores of the MBs in the frame, wherein a weight coefficient of each MB is predetermined based on region of interest, and stored in the memory, or the lowest score of the scores of the MBs in the frame.

9. The display system of claim 7, wherein the current frame is identified as the qualified frame if the frame score of the current frame is not less than a predetermined threshold.

10. The display system of claim 7, wherein one of the current frame and a last frame is identified as the qualified frame if difference of the frame scores of the current frame and the last frame is less than a predetermined threshold.

11. The display system of claim 7, wherein one of the current frame and last two frames is identified as the qualified frame if a difference between a difference of the frame scores of the current frame and the last frame, and a difference of the frame scores of the last and second last frames is less than a predetermined threshold.

12. A method for displaying a media stream on a display based on a given access point with a display system, wherein the media stream has a plurality of frames, each frame comprising a plurality of macro blocks (MBs), the method comprising:
  decoding the plurality of frames in the media stream from a first frame defined by the given access point;
  scoring a plurality of MBs in a current frame that is being decoded, wherein the plurality of MBs includes intra-MBs that are decoded based on information in the current frame, and inter-MBs that are decoded based on information in previously decoded frames, wherein a score of an intra-MB is defined as a predetermined value, and a score of an inter-MB is generated based on scores of MBs in the previously decoded frames; and
  signaling the display to skip the current frame or start to display the media stream from a qualified frame identified based on the scores of the plurality of MBs in at least one of the current frame and the previously decoded frame.

13. The method of claim 12, wherein each MB comprises at least one prediction block, wherein each prediction block is decoded based on a corresponding reference block in a corresponding reference frame determined by a motion vector of the prediction block, wherein scoring an inter-MB in the current frame comprises:
  determining the corresponding reference block of each prediction block of the inter-MB in a corresponding reference frame based on the motion vector,
  breaking down the corresponding reference block of each prediction block into a plurality of portions that respectively are located within corresponding MBs of the reference frame,
  calculating a score of each portion based on the score of the corresponding MB, a proportion of an area of the portion and an area of the corresponding MB, and a quality distribution among the corresponding MB and adjacent MBs thereof,
  generating a score of each prediction block based on the scores of the plurality of portions of the each prediction block, and
  generating a score of the inter-MB by summing scores of the at least one prediction block in the inter-MB.

14. The method of claim 13, wherein if the reference blocks of the prediction blocks in the inter-MB belong to more than one reference frame, said summing the scores of the prediction blocks in the inter-MB comprises weighing the scores of the prediction blocks with corresponding weight coefficients of the more than one reference frame.

15. The method of claim 12, wherein the current frame is identified as the qualified frame if MBs that have scores below a predetermined threshold are out of a predetermined region of the current frame, or a distance between a position of a first MB that has the lowest score among the MBs in the current frame and a position of a second MB that has the lowest score among the MBs in a last frame is greater than a predetermined distance.

16. The method of claim 12, wherein the qualified frame is identified based on a frame score of at least one of the current frame and the previously decoded frames, wherein the frame score of each frame is determined based on scores of the MBs in the frame.

17. The method of claim 16, wherein the frame score of each frame is determined as a weighted sum of scores of the MBs in the frame, wherein a weight coefficient of each MB is predetermined based on a region of interest, or the lowest score of the scores of the MBs in the frame.

18. The method of claim 16, wherein the current frame is identified as the qualified frame if the frame score of the current frame is not less than a predetermined threshold.

19. The method of claim 16, wherein one of the current frame and a last frame is identified as the qualified frame if a difference of the frame scores of the current frame and the last frame is less than a predetermined threshold.

20. The method of claim 16, wherein one of the current frame and the last two frames is identified as the qualified frame if a difference between difference of the frame scores of the current frame and the last frame, and difference of the frame scores of the last two frames is less than a predetermined threshold.

* * * * *